United States Patent [19]
Bitterly et al.

[11] Patent Number: 5,268,608
[45] Date of Patent: Dec. 7, 1993

[54] FLYWHEEL-BASED ENERGY STORAGE METHODS AND APPARATUS

[75] Inventors: Jack G. Bitterly, Woodland Hill; Steven E. Bitterly, Agoura, both of Calif.

[73] Assignee: American Flywheel Systems, Inc., Bellevue, Wash.

[21] Appl. No.: 848,879

[22] Filed: Mar. 10, 1992

Related U.S. Application Data

[62] Division of Ser. No. 640,282, Jan. 11, 1991, Pat. No. 5,124,605.

[51] Int. Cl.$^5$ .......................... H02K 5/16; H02K 7/08
[52] U.S. Cl. ...................................... 310/90
[58] Field of Search ....................... 310/90, 74; 384/12, 384/13, 97, 100, 132, 234

[56] References Cited

U.S. PATENT DOCUMENTS 4,613,761  9/1986  Yabunaka ............... 310/153 X

FOREIGN PATENT DOCUMENTS 0290228  12/1986  Japan ........................ 384/12
0294218  12/1986  Japan ........................ 384/12

*Primary Examiner*—Steven L. Stephan
*Assistant Examiner*—E. To
*Attorney, Agent, or Firm*—Woodcock Washburn Kurtz Mackiewicz & Norris

[57] ABSTRACT

Flywheel-based energy storage devices are provided along with methods for their use and fabrication. The devices have the capacity to store electric energy as kinetic energy and to generate electric energy from the stored kinetic energy. Preferred devices comprise a pair of counter-rotating anisotropic flywheels which are designed to rapidly rotate within an evacuated housing. The flywheels comprise a lightweight hub and a circumferentially-wound fiber rim. The hub and rim are fabricated from materials having high tensile strength and are connected with system of novel tube assemblies positioned around the hub parallel to the axis of rotation. The flywheel are principally supported by magnetic bearings and are further stabilized during rotation by a self-restoring liquid bearing system.

10 Claims, 5 Drawing Sheets

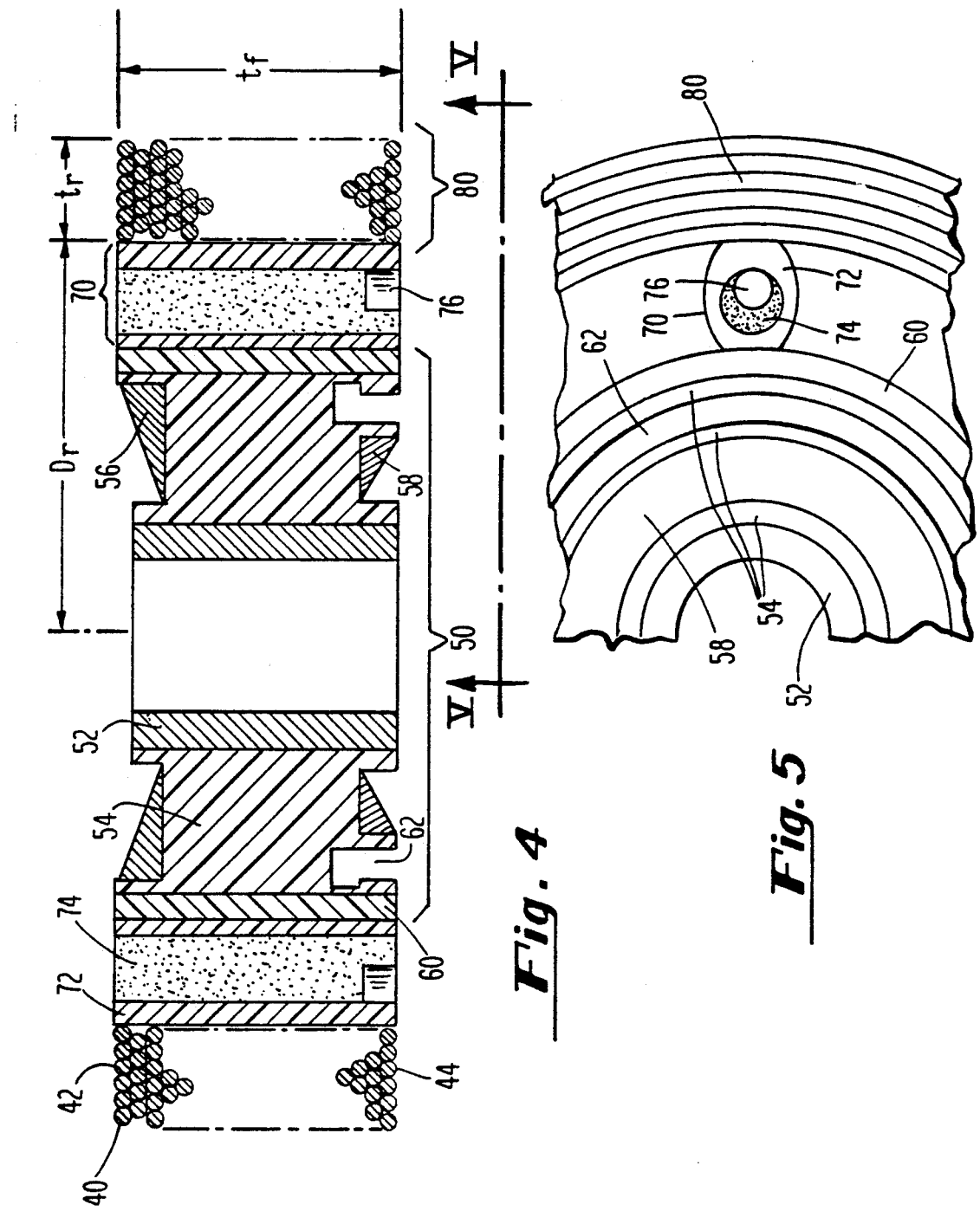

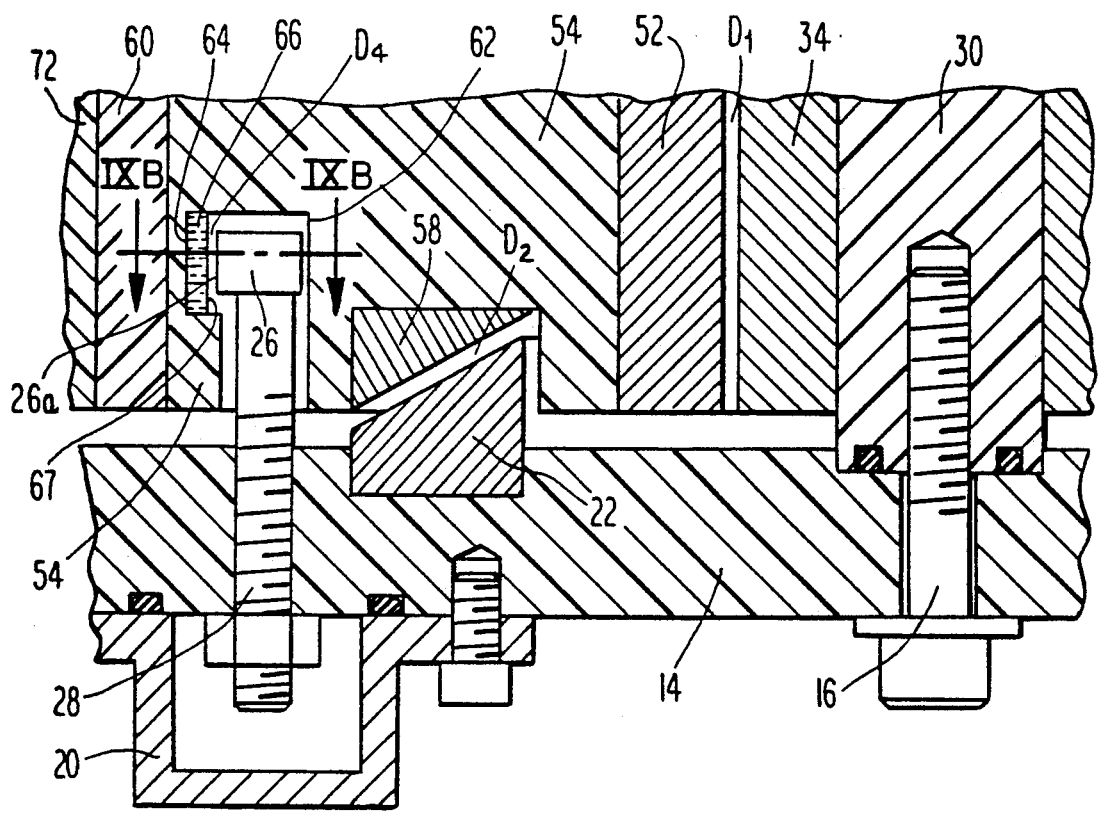
Fig. 9a
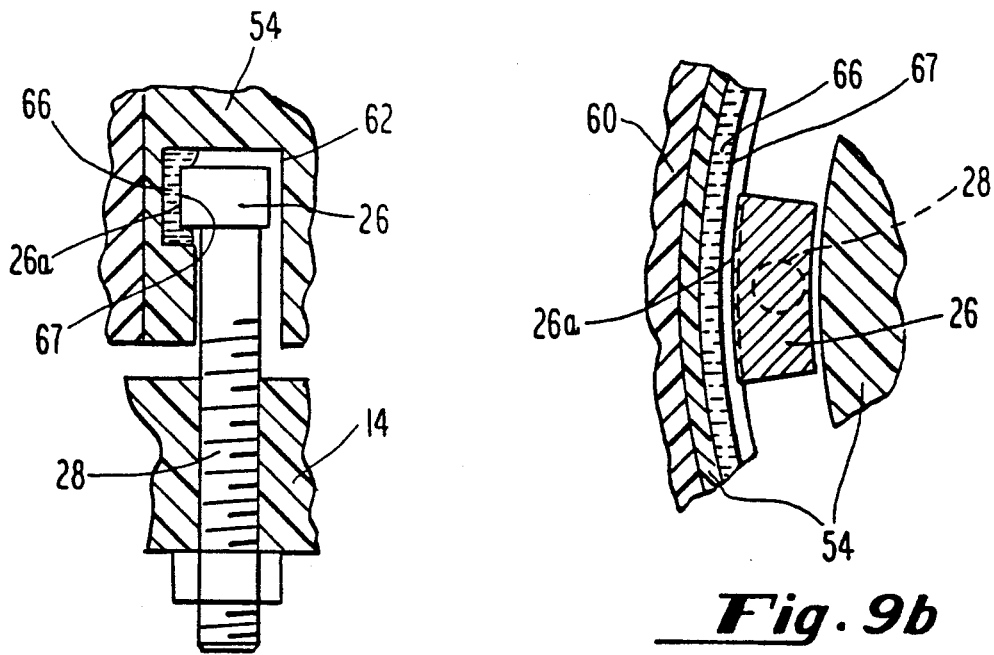
Fig. 9c
Fig. 9b

FLYWHEEL-BASED ENERGY STORAGE METHODS AND APPARATUS

This is a division of application Ser. No. 640,282, filed Jan. 11, 1991, U.S. Pat. No. 5,124,605.

FIELD OF THE INVENTION

This invention relates to the field of energy storage and, more particularly, to flywheel-based devices having the capacity to store electric energy as kinetic energy and to recover electric energy from the stored kinetic energy.

BACKGROUND OF THE INVENTION

The flywheel has long been used to store energy. The potter's wheel, invented approximate 5,000 years ago, probably was one of the first devices to employ a flywheel for energy storage.

The flywheel is attractive from an energy storage perspective for a number of reasons. It is a relatively simple device from which it is possible to store and abstract energy readily, either by mechanical means or by using electric motors and generators. In theory, high power generation rates are possible and there are no inherent limitations on the number of charge and discharge cycles that can be used. Charge capacity should not be affected by age or the number of prior charge and discharge cycles, which is not the case for known batteries.

The energy density capability of a flywheel, also known as its specific energy, is given as:

$$T = K_s \sigma / \rho$$

where T is the specific energy, $K_s$ is a flywheel shape factor, $\sigma$ is the tensile strength of the material from which the flywheel is constructed, and $\rho$ is the material density. Energy density typically is expressed in watt-hours per pound (W-hrs/lb), watt-hours per kilogram (W-hrs/kg), or joules per kilogram (J/kg).

Flywheels may be generally characterized as isotropic or anisotropic depending on their material structure; flywheels combining certain features of isotropic and anisotropic forms are also known. Isotropic flywheels typically are designed such that each particle of the flywheel mass is stressed equally in all three orthogonal dimensions. In general, these flywheels are very thin at their circumference and thick at their hub. However, there are many possible variations which involve bulges or other shapes on the outer edge. These variations attempt to maximize the rotational inertia of the flywheel—and, hence, increase the flywheel's energy storage capability—by holding the entire flywheel mass at the same stress level while at the same time placing as much mass as possible at the outer portion of the radius. Unfortunately, the energy density is very poor for all known materials that appear useful in isotropic systems. Expensive tool steel probably provide the best example of materials which can be machined to the desired shapes. However, tool steels cannot be processed into large sizes without the potential for material flaws which lead to crack propagation during high stress loads.

Anisotropic flywheels typically utilize materials which possess exceedingly high strengths in one dimension but considerably lower strengths in the other dimensions. These devices usually have comprised wound fibers. Accordingly, most anisotropic flywheel possess only nominal radial strength but are able to withstand a great deal of tangential stress. However, because fibers typically are weak in the radial direction and because said flywheels have been axially wound, these configurations must usually be constructed as thin rims. A rim can carry the highest known energy density because it contains all of its useful, high inertial mass at the outermost radius. The only theoretically limiting factor is the maximum allowable tangential stress for the constituent material. Accordingly, known energy storage devices constructed with thin rims—while possessing a very high energy density—typically cannot store large amounts of energy.

For both isotropic and anisotropic flywheels, the key to storing large amounts of energy is to employ materials having high specific strength, that is high maximum tensile stress in relation to weight density. Many of the materials presently known in the art to have high specific strength are available only as fibers. These materials typically cannot be cast or machined into the shapes required for fabrication of isotropic flywheels. Isotropic flywheels presently can only be made from metallic materials which have relatively low specific strengths. Even if strong composite materials were to be developed which could be machined or cast into isotropic structures, they likely still would have the same problems of all rotational wheels which transfer their radial loads back to the rotational axis unless they were somehow de-coupled as in the form of concentric rings. Therefore, isotropic flywheels probably will always have an energy density about an order of magnitude lower than anisotropic, rim-type flywheels. Accordingly, anisotropic flywheels are preferred for energy storage applications.

However, many problems have been encountered in the design and construction of anisotropic flywheels which can be operated at the high RPM which are desired for energy storage. Significant improvements in anisotropic flywheels were made possible by the disclosures of R. F. Post in U.S. Pat. No. 3,683,216 and of R. F. Post and S. F. Post, Scientific American, 1973, 229;6, 17–23, suggesting the use of fiber composites to increase energy density. The Posts proposed that a set of fiber wound rims of decreasing outer radial material weight densities would meet the conditions for maximizing the rotational inertia —and, hence, kinetic energy storage—while still decoupling the very high radial stress loads that would ensue if the material was made to be contiguous from axis to outer periphery.

Theoretically, the Post design can achieve both high energy densities and high volumetric energy storage potentials. However, this design has a number technical problems relating to the manner in which the rim or rims are connected to the hub. In order to obtain a system that can effectively withstand dynamic and environmental vibrations, the rim must be rigidly supported about its rotational axis as it changes shape during operation and rotation speed variation. A considerable amount of research over the last two decades has been directed toward the development of anisotropic flywheels which are dynamically stable from rim to hub.

For example, T. W. Place, "Composite Material Flywheel for UMTA Flywheel Trolley Coach", 1980 Flywheel Technology Symposium, October 1980, Scottsdale, Ariz., disclosed rim-type rotors comprising a few tightly fit fiber rims of decreasing density from the inside diameter outward. The rims were wound in compression on each other and press warped in a non-circular cruciform spoke configuration. This shape placed non-uniform stresses on the wound material, suffered from high stress loads at the spoke contacts, and experienced high point load strains on the wound material due to nonuniform radial growths which necessarily occur because of the compressive spoke contact loadings. This configuration was also not successful because of unsymmetrical warping about the axis of rotation, which prevented the wheel from remaining in balance at all speeds from zero to its maximum design value.

P. C. Poubeau, "Flywheel Energy Storage Systems Operating on Magnetic Bearings", 1980 Flywheel Technology Symposium, October 1980, Scottsdale, Ariz., disclosed flywheels wherein material is wound around radial spokes. Instead of winding the rim with composite fibers, these flywheels employ very high strength piano wire. However, even the highest grades of steel wire still have considerably lower specific strengths than composite materials. Therefore, the potential for high energy density storage is more limited even than the concept suggested by Place.

The flywheels proposed by both Place and Poubeau satisfy the need for high inertial volumetric packing; that is, they place the majority of the flywheel weight at the outer periphery. The flywheels are also able to radially decouple from the hub assembly. However these designs produce high point stress loads on the wound rim and produce an undesirable concentration of bending strains which unduly limit the total energy storage by failure at the spoke locations. They are also subject to high dynamic imbalance problems due to the wide variable stretch which can lead to non uniform differential radial strains between spokes.

S. F. Post and F. C. Younger, "Design and Fabrication of a Flywheel Rotor for Automatic Use", 1980 Flywheel Technology Symposium, October, 1980, Scottsdale, Ariz., proposed a configuration which employs rims of differing weight density. The rims are radially detached from the hub assembly, thus eliminating the coupling of high radial stresses down to the axis of rotation. This design uses a set of composite wraps attached to the rim by weights. During periods of relatively high RPM, the banded wraps (called tensioned balanced catenary spokes by the authors) press down on the hub assembly, creating a type of coupling between the rim and hub. However, the configuration requires a multitude of wraps to attain the desired bearing pressure loading on the hub and, consequently, cannot be practically manufactured. Also, this configuration fails to offer good, uniform axial stability between the rim and hub, largely because it cannot arrest slight axial rim vibrations. Slight off-axis centering between the rim and hub can occur during normal vibration, thus creating imbalance in a highly dynamic system. Finally,,,the weights attached to the inside surface of the composite wraps put a great deal of pressure on the wrap itself, thereby creating a point of weak contact.

D. G. Ullman and J. Corey, "The Accelerating Flywheel", 1980 Flywheel Technology Symposium, October, 1980, Scottsdale, Ariz., proposed a flexible flywheel rim configuration which attempts to decouple the radial stresses from the rim to hub. However, there are at least two major difficulties with this flywheel design. First, the spring constants between the flywheel's hub and rim are very small, creating a situation where adverse radial micro-movement of the rim system cannot be arrested by the hub's radial loading about the axis of rotation. Accordingly, the flywheel is highly subject to dynamic instabilities with any modal oscillation. Secondly, assuming that the flywheel could get up to speed without undergoing radial oscillation, a serious problem would occur when power is extracted from the flywheel. The rim would continue rotating because of its own high inertia, while the loose bands which connect the hub to the rim would instantly unwind or tend to reverse with high peak tension loads because there is no azimuthal rigidity between these structures.

C. E. Knight, "Analysis of the Deltawrap Flywheel Design", 1977 Flywheel Technology Symposium Proceedings, October 1977, San Francisco, Calif., disclosed a configuration wherein rims or discs are mounted to hubs and an overwrap material surrounds the entire device. The rationale behind this flywheel is that the overwrap holds the flywheel stationary about its axis of rotation and provides additional strength in the radial direction. However, the enhanced radial strength comes at the expense of additional weight from the overwrap, which must be constructed with thick fiber bands of uniform density in order to maintain rigidity of the entire rotating structure. Also, small radial growths will naturally occur in a non-uniformly azimuthal fashion, since the expansion of the overwrap cannot allow for precisely equal radial growths over the entire azimuth. This then produces a condition of highly variable dynamic imbalance.

S. V. Kulkarni, "The Flywheel Rotor and Containment Technology Development Program of the U.S. Department of Energy", 1980 Flywheel Technology Symposium, October, 1980, Scottsdale, Ariz., investigated a design which employed a thick, multi-layered, composite disc in which the fibers in each layer are parallel to one another, but each layer is slightly rotated relative to the next. The entire set of discs is bonded or laminated into one thick disc. A parallel fiber configuration maintains each layer in a condition where along one axis the fibers are in tension while in the orthogonal direction there is virtually no fiber strength. The entire strength comes from the epoxy used to bind the fibers, which greatly limits the strength potential of the fiber and limits the attainable energy density to relatively lower values. In these designs, higher strength composite fiber materials were chosen rather than isotropic metal fibers in order to take advantage of the greater strength potential of the fibers. The materials employed met the condition of high strength, but the design configurations were limited in optimal stress management and weight distribution. Therefore, the flywheels could not attain as high an energy density as rim type designs.

Thus, despite the intense efforts of those in the art, there still exists a need for practical flywheels which are useful in energy storage applications.

SUMMARY OF THE INVENTION

The present invention provides energy storage devices which preferably comprise a pair of counter-rotating, anisotropic flywheels, as well as methods for their use and fabrication. The flywheels of the invention have higher energy densities than flywheels presently known in the art and are designed to rotate at speeds up to about 200,000 RPM, depending on the radial size. The flywheels are preferably provided with magnetic bearings and liquid bearings and perform within an evacuated, protective housing.

In preferred embodiments, the energy storage devices comprise a housing together with a stationary shaft assembly which comprises an axis-defining shaft. The shaft assembly is contained within the housing and preferably comprises a plurality of electromagnetic shaft bearings substantially surrounding the shaft.

The devices further comprise a first flywheel which is adapted to rotate around said axis and which comprises a plurality of tube assemblies substantially parallel to said axis. The devices also comprise a second flywheel which is adapted to rotate around said axis in a direction counter to the direction of the first flywheel and which comprises a plurality of tube assemblies substantially parallel to said axis.

In general, preferred flywheels comprise a hub, a plurality of tube assemblies, and a rim. The hub, which may be fabricated from any strong, lightweight material, comprises a magnetic bearing sleeve opposite the shaft bearing. Preferably, the hub also comprises a liquid-containing channel which, together with a plurality of cams attached to the housing, provide a self-restoring bearing system.

The rim preferably comprises a fiber having high specific strength which is wound so as to have a generally minimized intersticial volume.

The hub and rim are connected by the plurality of tube assemblies which, in preferred embodiments, individually comprise a tube or tube-like structure and a core material and permanent magnet contained within the tube. The tubes are shaped to contour the inner diameter of the rim and the outer diameter of the hub to prevent dislocation during flywheel rotation.

In preferred embodiments, energy is stored and released through the interaction of a rotating permanent magnet or magnetizable material such as the bearing sleeve with a stationary electromagnet such as the shaft bearing.

BRIEF DESCRIPTION OF THE DRAWINGS

The numerous objects and advantages of the present invention may be better understood by those skilled in the art by reference to the accompanying figures, in which:

FIG. 4 is a cross-sectional view of a preferred flywheel of the invention, as indicated by line IV—IV in FIG. 3.

FIG. 5 is perspective view of a tube assembly of the present invention in place within a flywheel, as indicated by line V—V in FIG. 4.

FIG. 9a is an enlarged view of the portion of FIG. 2 indicated by area IX.

FIG. 9b is a cross-sectional view of a preferred energy storage device of the invention, as indicated by line IXB—IXB in FIG. 9a.

FIG. 9c is an enlarged view of the portion of FIG. 2 indicated by area IX, showing the effects of radial perturbation.

DETAILED DESCRIPTION OF THE PREFERRED EMBODIMENTS

Flywheel based energy storage systems typically require a protective housing or containment vessel in the event that kinetic energy is suddenly released by a catastrophic system malfunction. The type of protective housing is largely dictated by the configuration of the flywheel. For anisotropic flywheels, failure usually occurs due to either radial delamination or tangential breakage of the rim followed by fractured unwinding. This typically applies a tremendous frictional loss to the entire rotating system; as the rim shreds itself the rotational energy turns almost entirely into thermal energy, which can dissipate by radiation and/or conduction. The preferred protective housing for a fiber wound rim is itself a thin fiber wound rim with an inner layer or sleeve of silicon carbide or another similar heat insensitive material to insulate the housing from the internal heat buildup. Since silicon carbide can stand exceedingly large temperatures without great loss of structural integrity, the protective housing will be substantially shielded from the heat energy.

Figure 1:
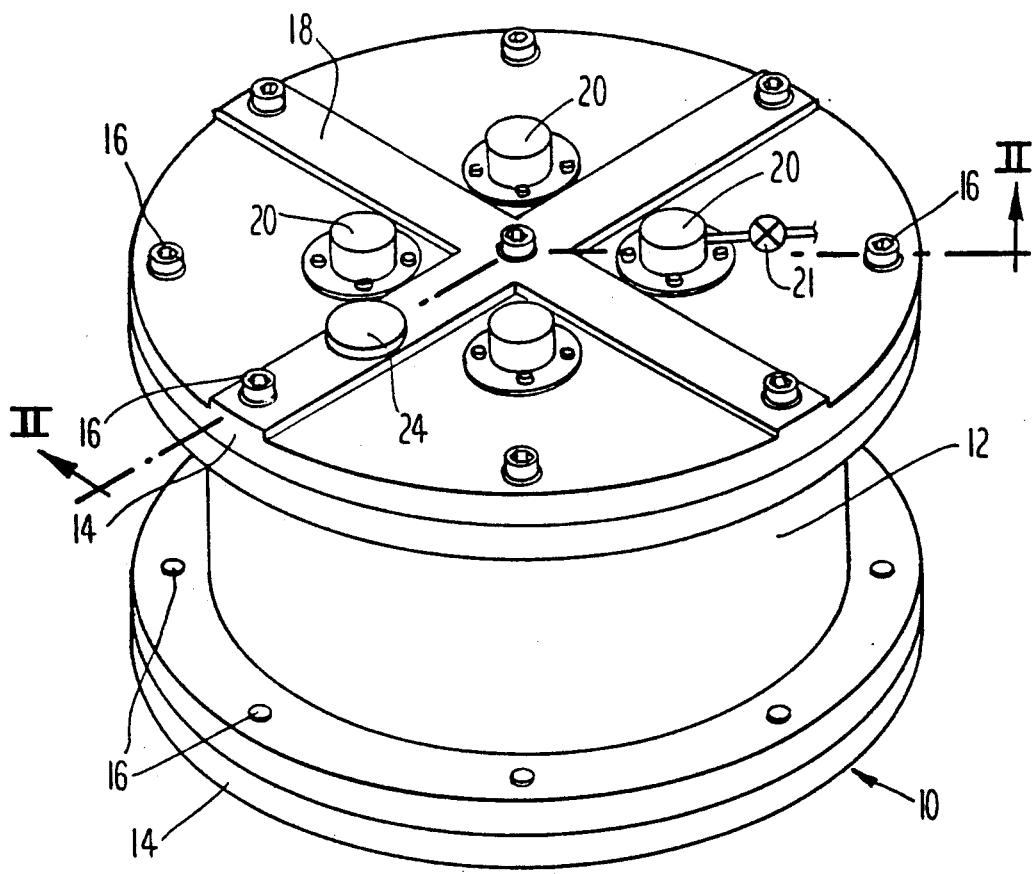
FIG. 1 is an isometric view of a preferred energy storage device of the present invention.

Referring to FIG. 1, energy storage devices of the present invention preferably comprise an evacuated protective housing 10 formed by a lateral wall 12 which is capped at its ends, such as with end bells 14. The lateral wall 12 and end bells 14 may be attached with O-rings or by any of the techniques known in the art, so long as the housing 10 can be hermetically evacuated to a preferred pressure below atmospheric pressure, preferably below about 0.001 Torr. In preferred embodiments, lateral wall 12 and end bells 14 are fastened with screws 16 or other fastening means such as clamps, adhesives, and the like. Lateral wall 12 and end bells 14 preferably are wound, cast, or molded from a lightweight, high-strength material or composite with internal coatings, sleeves, and/or end plates of silicon carbide or another heat resistant material. It is preferred that housing 10 be wound from aromatic polyamide fiber. As recognized by those skilled in the art, aromatic polyamides are more commonly known as aramids. It also is preferred that end bells 14 have a series of structural ribs 18 or other reinforcing means. It is preferred that end bells 14 have at least four ribs 18. Housing 10 may be internally coated with a gas-impermeable film or metal foil to assure that hermetic evacuation is maintained.

Figure 2:
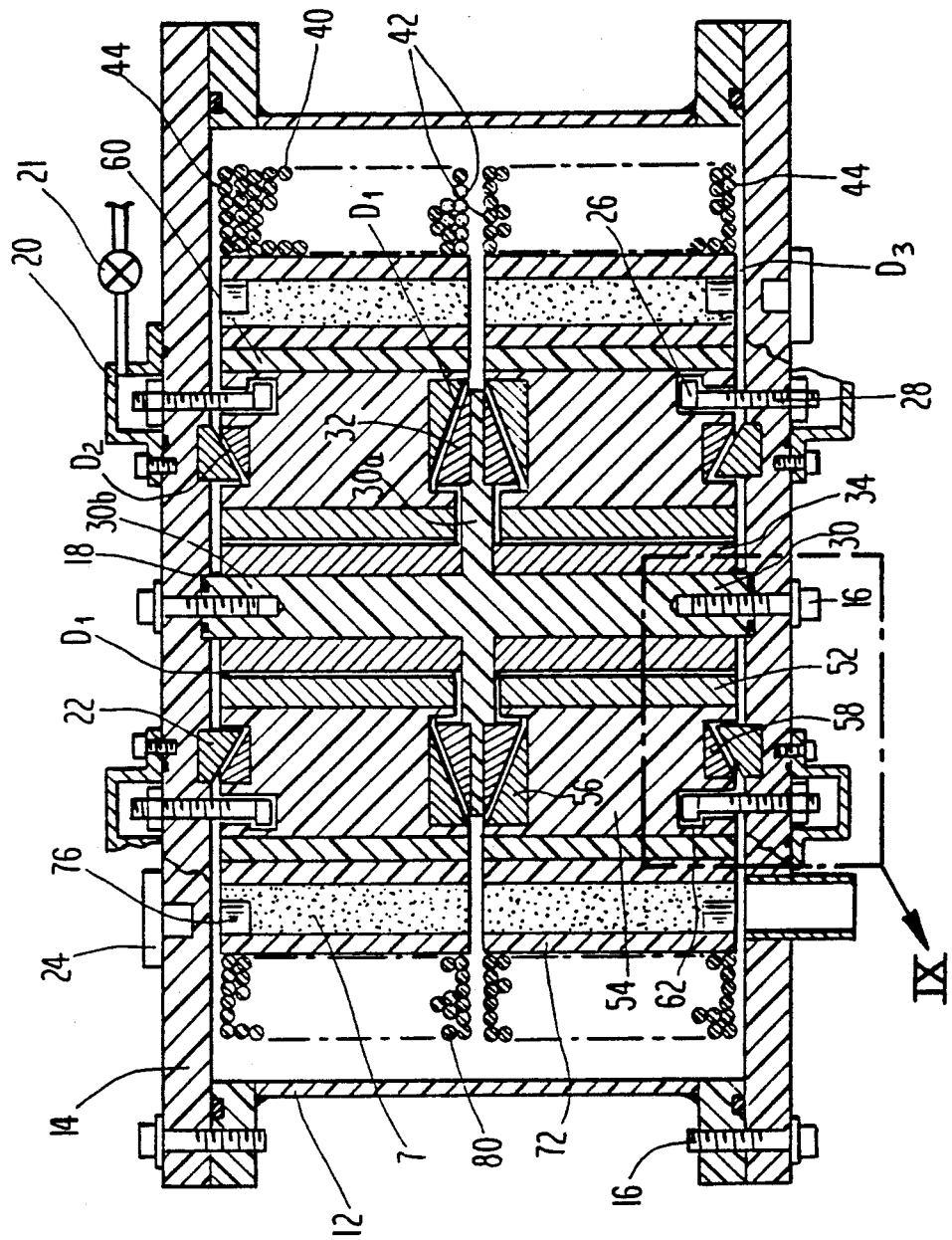
FIG. 2 is a cross-sectional view of a preferred energy storage device of the invention, as indicated by line II—II in FIG. 1.

FIG. 2 is a cross-section of the device of FIG. 1, showing additional structure. A shaft assembly 18 is preferably contained within housing 10. Shaft assembly 18, which does not rotate during normal operation of the energy storage device, comprises a shaft 30, a plurality of magnetic shaft bearings 32, and a plurality of magnetic shaft sleeves 34. As can be seen in FIG. 2, shaft 30 generally defines an axis of rotation and is shaped to have a flange-like, double sided radial portion 30a positioned between two substantially cylindrical axial portions 30b. Shaft 30—which can be fabricated from any of the many lightweight, high-strength materials known in the art—preferably is firmly attached to either end bell 14, thereby providing columnar support to the otherwise weakest points of housing 10. Connected to shaft 30 are two magnetic shaft bearings 32. Shaft bearings 32, which are positioned on opposite sides of radial portion 30a, should have a gradually decreasing thickness, as shown in FIG. 2. In preferred embodiments, shaft bearings 32 are electromagnetic; that is, they possess the properties of an electromagnet, wherein a magnetic field is produced by an electric current. Shaft bearings 32 preferably comprise a plurality of azimuthally-oriented elements such that any one or more of the elements can be electronically controlled to provide vibrational, shock, or environmental corrections to flywheel 40 to maintain dynamic stability. The axial portions 30b of shaft 30 are surrounded by magnetic shaft sleeves 34, which preferably are also electromagnetic. It will be recognized that electromagnetic structures such as shaft bearings 32 and shaft sleeves 34 need not be magnetic at all times but must, at minimum, be magnetizable with relatively short time/flux constants.

Figure 3:
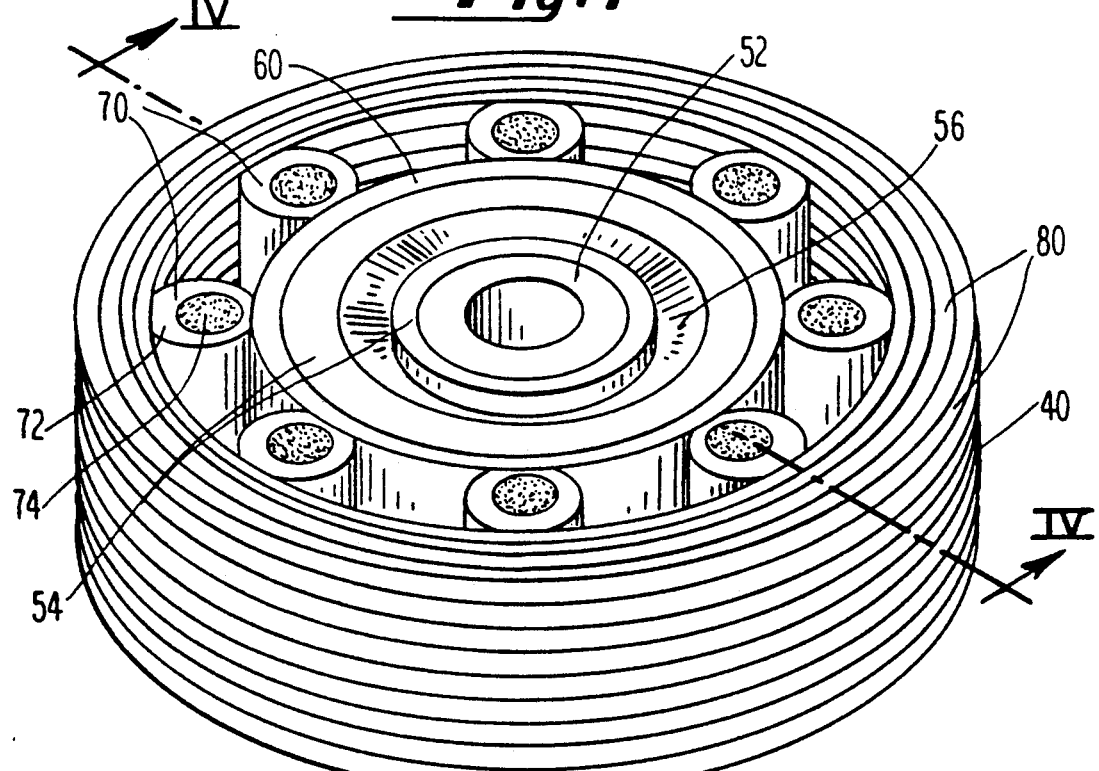
FIG. 3 is an isometric view of a preferred flywheel of the present invention.

The shaft assembly supports two substantially anisotropic flywheels 40. Flywheels 40, which are shown in greater detail in FIGS. 3 and 4, are adapted to counter-rotate about the axis defined by shaft 30, thereby eliminating any adverse gyroscopic effects. Flywheels 40 preferably are identical but for their placement on the shaft assembly. They have a thickness $t_f$ defined by a first face 42 and a second face 44. Preferably, flywheels 40 are positioned on the shaft assembly such that their first faces 42 are proximate one another and, hence, their second faces 44 are remote from one another.

As shown in FIG. 4, flywheels 40 individually comprise a hub 50, a plurality of tube assemblies 70 positioned around the outer periphery of the hub 50 substantially parallel to the axis of rotation and a rim 80 having thickness $t_r$ positioned around the outer periphery of the tube assemblies a distance $D_r$ from the axis of rotation.

The hub 50 preferably comprises a magnetic bearing sleeve 52 at its inner diameter and a lightweight core material 54 substantially surrounding the periphery of bearing sleeve 52. A portion of the core material forms a portion of each flywheel face. Hub 50 further comprises a first magnetic ring 56 contained within the portion of the core material which forms the first face of flywheel 40 and a second magnetic ring 58 contained within the portion of the core material which forms the second face of flywheel 40. Hub 50 is preferably pressed around bearing sleeve 52 such that compression forces hold together its components. Assembly is accomplished by using temperature differential techniques, as known in the art, or by winding fiber around bearing sleeve 52. Bearing sleeve 52, first ring 56, and second ring 58 preferably comprise both a magnetizable material and a permanent magnet or a material having similar properties. Those skilled in the art will recognize that a permanent magnet is one which retains a considerable amount of magnetism indefinitely and which provides a relatively constant source of magnetism. The magnetizable material preferably loses magnetic flux rapidly and is wholly or partially servo-activated by proximity instrumentation. In preferred embodiments, bearing sleeve 52, first ring 56, and second ring 58 comprise alternating layers of permanent magnets and magnetizable material.

Preferably, core material 54 and collar 60 are fabricated from a wound, high-strength fiber, such as an aramid fiber. In general, it is preferred that hub 50 have a modulus of elasticity which increases with radial distance from the axis of rotation. Thus, bearing sleeve 52 is constructed to have a modulus of elasticity which is lower than that of core material 54, while collar 60 should have a modulus of elasticity which is greater than both the bearing sleeve and the core material. The modulus of elasticity of hub 50 may increase in a stepwise fashion as one progresses outward from bearing sleeve 52, but more preferably increases very gradually. Collar 60 acts as a general support for the hub 50 and as the primary radial support for first magnetic ring 56, whereas core material 54 supports second magnetic ring 58. Collar 60 to a large extent also supports the centrifugal load of liquid 66 contained in channel 62.

In preferred embodiments, the flywheels are positioned on the shaft assembly such that shaft sleeve 34 is adjacent bearing sleeve 52 and first magnetic ring 56 is adjacent shaft bearing 32, as in FIG. 2. Flywheels 40 preferably are separated from the shaft assembly by predetermined distance D which is maintained by magnetic repulsive forces between shaft bearings 32 and first rings 56 and between shaft sleeves 34 and bearing sleeves 52. The repulsive forces preferably are produced by fabricating the adjacent elements from materials which have or can be made to have like magnetic polarization. The distance $D_1$ preferably is from about 0.5 to about 2 millimeters. Magnetic repulsive forces also maintain a separation distance $D_3$ between flywheels 40 and housing 10. Thus, flywheels 40 are positioned such that second magnetic rings 58 are opposite housing bearings 22 and are separated by a distance $D_2$ which is equal to distance D . In preferred embodiments, the distances $D_1$, $D_2$, and $D_3$ are equal.

In preferred embodiments, core material 54 defines a circumferential channel 62 at second face 44 of flywheel 40. Channel 62 preferably is continuous and centered about the axis defined by shaft 30. Channel 62 is one element in a system for stabilizing the flywheel during rotation and will be later discussed in connection with that function.

Hub 50 and rim 80 are designed to differentially grow within their elastic limits in order to eliminate the transfer of outer radial stress to the hub axis. Since the inner and outer surfaces of rim 80 expand outward during high speed rotation, hub 50 must expand at least as rapidly. In preferred embodiments, hub 50 expands more rapidly than the inner surface of rim 80. This can be accomplished if the modulus of elasticity of hub 50 is less than the modulus of elasticity of rim 80. Otherwise, rim 80 likely will separate from flywheel 40.

The flywheels of the present invention require a connection system which will securely fasten the various flywheel component parts to one another in order to maintain dynamic stability over all operational RPM ranges encountered. The connection systems of the present invention comprise tube assemblies 70, which allow for differential radial expansion of hub 50 and rim 80. If hub 50 expands more rapidly than rim 80, tube assemblies 70 will be increasingly compressed as the RPM increases. This results in an effectively increased spring constant for tubes 72, thus satisfying the requirements of dynamic stability.

As shown in FIG. 3, a plurality of tube assemblies 70 preferably are positioned around the periphery of hub 50 in contact with the inner diameter of rim 80. The tube assemblies enable flywheels 40 to sustain large shock loads in any direction and also to sustain the necessary spring constants exerted by the differential expansion of hub 50 and rim 80. In preferred embodiments, hub 50, tube assemblies 70, and rim 80 acting together are designed such that the tube assemblies possess radial spring constants which increase as the flywheel RPM increases. This is accomplished by designing hub 50 to expand more rapidly than rim 80.

Tube assemblies 70 are pre-compressed or pre-loaded within flywheel 40 in order to maintain dynamic stability at high RPM. The total pre-compression force should be divided between each tube assembly 70. Six or more tube assemblies are generally preferred to maintain stable pressure forces surrounding the hub 50. However, at least 8 tube assemblies are preferred. Flywheels according to the present invention could have as few as 5 tube assemblies. Such would be the case where a flywheel's anticipated operating conditions—such as, for example, RPM range—dictate that tube assemblies having relatively large diameters be used.

As shown in FIG. 4, tube assemblies 70 preferably comprise a tube 72 and a permanent magnet 76 contained within the tube. In certain embodiments, however, tube 72 alone will suffice. It is preferred that permanent magnet 76 be located adjacent the second face 44 of flywheel 40. Preferred tube assemblies 70 further comprise a lightweight core casting material 74 within tube 72. As discussed below, permanent magnets 76 in certain preferred embodiments are involved in the transfer of energy into and out of the energy storage devices of the present invention.

The cross-section of tubes 72 should have a substantially arcuate shape. They may be perfectly circular, slightly eccentric, or elliptical. Preferably, tubes 72 are somewhat ovoid. As in FIG. 5, tubes 72 are slightly thicker at positions proximate rim 80 than at positions proximate hub 50. This shape is to account for the "g" forces encountered during rotation of flywheel 40.

Figure 6:
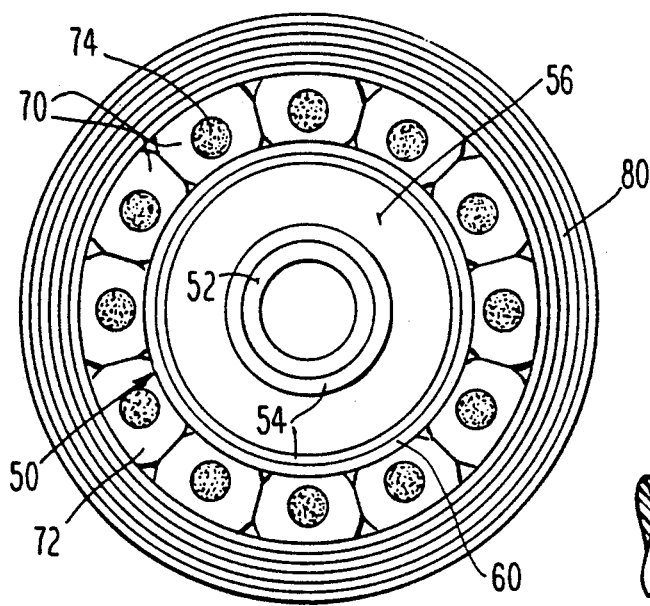
FIG. 6 is a plan view of a first face of a flywheel of the present invention having tube assembles in contact with one another.

As in FIG. 5, it is preferred that a portion of tubes 72 be cut away or otherwise modified to increase the area of contact with both the outer diameter of hub 50 and the inner diameter of rim 80. Accordingly, the portions of tubes 72 in contact with hub 50 will be substantially concave, while the portions in contact with hub 80 will be substantially convex, resulting in a generally heel-shaped cross-sectional tube outer surface. This shape is believed to anchor tube assemblies 70 and prevent them from rolling or otherwise dislocating during the accelerating or decelerating rotation of flywheels 40. In another preferred embodiment shown in FIG. 6, an even greater portion of each tube assembly 70 is modified—in this case flattened—to allow for contact with one another. This arrangement allows for even greater stability during rotation and/or the installation of more tube assemblies. It will be recognized that an azimuthal space should be provided between each tube assembly 70 so that each can be compressed during spring constant operation.

Tubes 72 may be fabricated by any known technique, so long as the above-described shapes are attained. In preferred embodiments, tubes 72 are molded rather than spun from fiber. They may be fabricated from any high-strength material having a spring constant appropriate for the rotational and other forces to which flywheel 40 will be exposed.

Core material 74 may be any of the lightweight materials known in the art, so long as it is strong and able to support permanent magnet 76 within tube 72 at the point furthest from the axis of rotation, thereby providing solid support for its rotating mass. In preferred embodiments, the modulus of elasticity of core material 74 is less than that of tube 72.

Rim 80 is positioned around tube assemblies 70. In preferred embodiments, rim 80 is constructed by winding fiber circumferentially around a mandrel or other similar winding substrate having a radius approximately equal to flywheel distance $D_r$. Rim 80 may be wound from any of the high-strength materials which are presently available or yet to be developed. The potential effectiveness of a material employed in rim 80 is directly related to its specific strength. Aramid, glass, and carbon fibers, which are preferred rim materials, generally possess high specific strength, are readily available, and are easy to work with. A variety of useful aramid composites are available from E. I. duPont & Co, Inc. of Wilmington, Del. under the tradename Kevlar. Some materials are known to have higher tensile strengths than aramids but have larger weight densities and, hence, lower overall energy density. Table 1 lists useful rim materials in descending order of specific strength and, hence, potential energy density. All results are given at an 80% tangential stress, which is believed to be a suitable safety factor for anisotropic flywheels of this type.

TABLE 1

| | Fiber density (lbs/in$^3$) | Maximum tensile (ksi) | Axial modulus (10$^6$ lbs/in$^2$) | Specific strength (ksi/ lbs/in$^3$) | Energy density (W-hr/lb) |
|---|---|---|---|---|---|
| Fused Silica | 0.08 | 2,000 | | 25,000 | 181 |
| Technora (T220) | 0.05 | 598 | 11.4 | 11,960 | 86.5 |
| Kevlar 149 | 0.053 | 591 | 11.6 | 11,150 | 80.6 |
| Kevlar 49 | 0.052 | 550 | 18.0 | 10,580 | 76.5 |
| Graphite (AS4) | 0.065 | 520 | 34 | 8,000 | 57.9 |
| Graphite (T300) | 0.064 | 470 | 33.5 | 7,340 | 53.1 |
| Fiberglas (S-Glass) | 0.090 | 600 | 12.4 | 6,670 | 48.2 |
| Fiberglas (E-Glass) | 0.092 | 450 | 10.5 | 4,890 | 35.4 |

Fused silica, which has a weight density of 0.08 lbs/in$^3$ and a tensile strength of 2,000,000 psi, is another preferred fiber for rim winding. However, fused silica has only been tested in material laboratories and is not yet readily available.

An important feature which can be seen from Table 1 is the importance of specific strength in measuring the energy density storage potential of different materials. From a kinetic energy standpoint, whether a material derives its specific strength from increased tensile strength or from reduced weight density does not matter. As will be recognized, many high-strength, lightweight fibers are manufactured as a twisted mass of individual filaments. However, in order achieve maximum filament density, it is preferred that the fibers employed in the present invention comprise untwisted filaments which are oriented in a generally parallel fashion wherein each filament is positioned within the grooves formed by each underlying filament layer.

The particular manner in which rim 80 is wound from fiber demands particularly high quality control in order to provide a flywheel having maximum strength. As will be appreciated, the surface of a wound fiber defines a plurality of interstices. It is preferred that the interstices formed by the wound fiber within rim 80 comprise an adhesive or some other material, preferably an epoxy, having the capacity to bind the fiber to itself and to tube assemblies 70. The adhesive may be placed within the interstices by any known method. For example, it may be introduced after the fiber has been wound. Preferably, the fiber is coated before winding with an amount of adhesive sufficient to fill the interstices. For example, the fiber could be dipped into an adhesive-containing bath and then wound. Materials and conditions should be selected to minimize the inclusion within rim 80 of substances other than adhesive and fiber. Accordingly, preferred adhesives do not emit gasses. Exemplary adhesives include diglycidyl ethers of bisphenol-A cured with anhydrides, aromatic amines, or dicyandiamide, tetraglycidyl diaminodiphenylmethanes cured with aromatic amines, and vinyl and isophtalic esters cured with peroxides. Also, winding of adhesive-coated fiber is preferably performed below atmospheric pressure, more preferably below about 0.001 Torr. or at least above the boiling point pressure of the adhesive.

Since the flywheels of the present invention preferably rotate in a vacuum, suitable precautions should be taken to exclude oxygen and other gaseous contaminants from the internal portion of protective housing 10. These contaminants might, for example, be trapped within flywheels 40 during the winding process and, over time, react with and degrade the flywheel or other components. To minimize such trapped contaminants, it is preferred that the winding processes of the present invention be performed under as strong a vacuum as possible.

It is also important to minimize the adhesive-filled intersticial volume in rim 80, as most adhesives detract from energy density. Typically, adhesive material has a much lower ultimate stress than, for example, an aramid composite material. Its primary role in the present invention is to prevent the highly stressed fibers from radially delaminating or fanning out in an uncontrolled manner.

Figure 7:
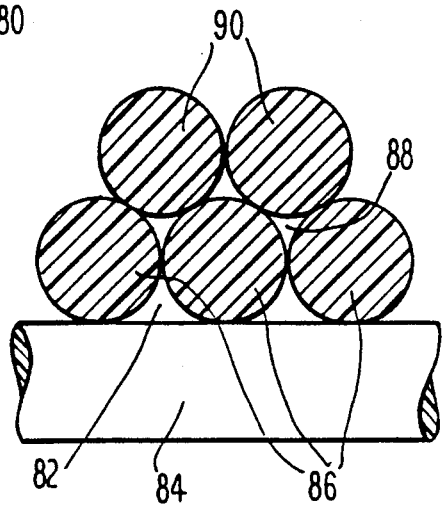
FIG. 7 is a cross-sectional view of parallel- and cross-wound fiber.

In accordance with the present invention, intersticial volume is minimized by circumferentially winding fiber in a generally parallel configuration rather than in a "cross" configuration. FIG. 7 shows a system of wound fiber comprising both parallel- and cross-windings. Note that the intersticial volume 82 between cross-wound fibers 84 and 86 is greater than the intersticial volume 88 than between parallel-wound fibers 86 and 90. The rims of the present invention should be wound in a parallel configuration wherein each successive layer fits in the grooves formed by each underlying layer. As can be seen from FIG. 7, the intersticial volume 88 between parallel fibers 86 and 90 represents only a small percentage of the volume occupied by the fiber. Winding done without extreme care will cause fiber crossing and poor layers, thus increasing the total interstitial volume with an unwanted decrease in the energy density of the energy storage device.

The energy density of flywheels according to the present invention may be further increased by adding an effective amount of low-density bodies to the adhesive before introduction of the adhesive into rim 80. The term "low density" is intended to refer to densities lower than that of the adhesive. The addition of these bodies should substantially decrease the effective specific gravity of the adhesive, thereby providing a rim which has density nearly equal to that of the fiber. It will be appreciated that low-density bodies can be fabricated from a wide variety of materials. Exemplary low-density bodies include hollow glass microspheres having diameters less than about 2%-4% the diameter of a Kevlar fiber filament, that is, from about $9.4 \times 10^{-6}$ to about $1.88 \times 10$ inches. The term "glass microspheres" as employed herein is intended to include any substantially spherical body which comprises an oxide of silicon such as, for example, silicon dioxide.

Factors which must be considered during rim winding include proper tension, uniform adhesive wetting, consistent environmental conditions, appropriate and evenly spaced fiber, mandrel spinning stability and lack of vibration, and controllable lay-down velocity. A typical rim preferably will have more than 50 million side-by-side fibers, each with less than 5% variation in the desired tangential stress load. Preferably, rims are made with the winding tension adjusted and kept continuously proportional to the theoretical tangential stress required at a given radial distance from the axis of rotation. Preferably, rim production is carefully controlled by computer and each facet of the many optimized variables relating to the final product is completely automated.

After fiber winding and adhesive introduction, the adhesive-bearing rim is allowed to cure or harden by, for example, the application of heat. Alternatively, the adhesive can be cured with ultraviolet light during the winding process. The mandrel is then removed, rim 80 is laid on a stable, flat surface, and hub 50 is placed within the rim. The dimensions of hub 50, rim 80, and tubes 72 before assembly of flywheel 40 should be selected such that the difference between the hub outer diameter and the rim inner diameter is slightly less than twice the diameter of a tube assembly. Accordingly, each tube 72 is placed in a vice or some other similar device and compressed to fit between hub 50 and rim 80. Tubes 72 are compressed with the required pre-loading pressure and spring constants to maintain dynamic stability at the highest anticipated operating RPM. Tubes 72 are then individually inserted in the space between the hub and rim. In preferred embodiments, the tube's compressed shape is maintained prior to insertion by filling its internal cavity with water while in the tube is in the vice and then freezing the water in situ. It is preferred that the water be contained by a supple, non-permeable membrane or some similar means. Surprisingly, the icecontaining tube maintains its compressed shape when removed from the vice. The tube can then be placed between hub 50 and rim 80. With warming, the ice melts and tube 72 expands against the hub and rim. In other embodiments, the tube internal cavity is filled with a material which melts at a temperature slightly greater than room temperature. The bismuth, lead, tin, and cadmium containing alloy which is commercially available from Cerro Corp. of New York, N.Y. under the tradename Cerrobend provides but one example of a material which melts slightly above room temperature. The use of such materials may allow for removal of the material without exposing tube 72 and other flywheel components to the temperatures required where water is employed.

Figure 8:
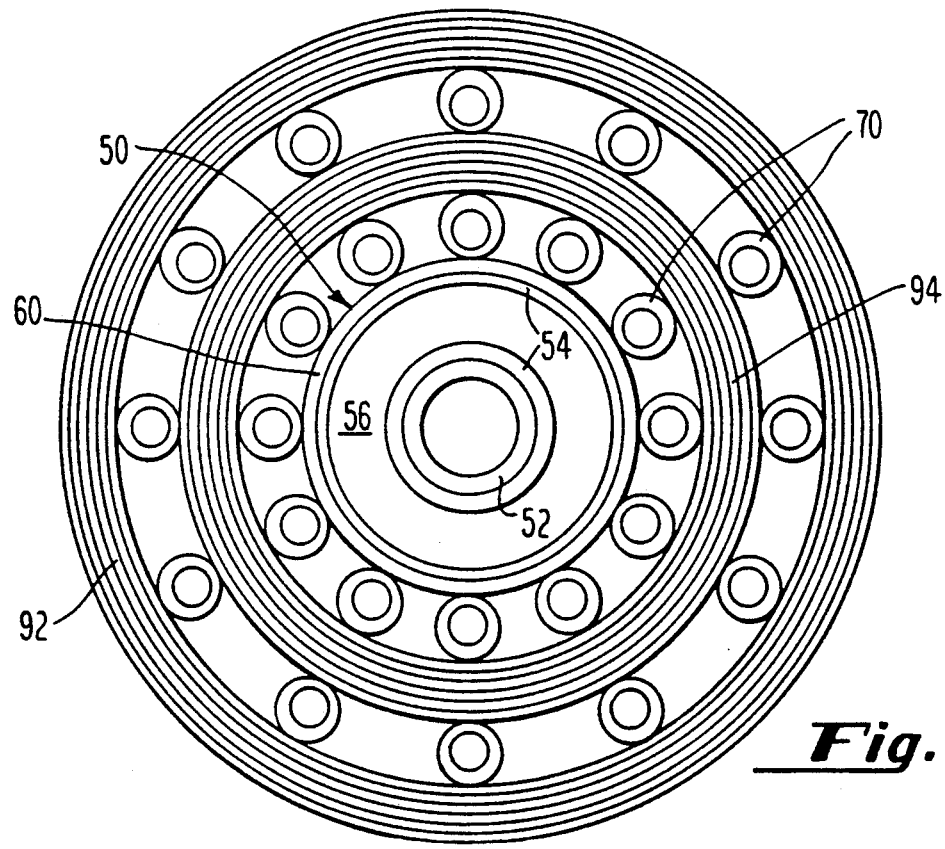
FIG. 8 is a plan view a first-face of a multiple-rim flywheel of the present invention.

It will be recognized that flywheels according to the present invention may comprise more than one rim, as shown in FIG. 8. Multi-rim flywheels are useful in energy storage devices when it is desired to maximize the storage capacity of a device in relation to the space it occupies, even at the expense of its overall weight. In a multi-rim flywheel, outer rim 92 will be in a more highly stressed "g" field than inner rim 94. Since kinetic storage can be described as stress divided by density, an increase in the mass of the fiber rims near the axis of rotation can be achieved by adding ballast to the inner rims such that the fiber mass in all rims is at the same stress level. Unfortunately, ballast—that is, dead weight or adhesive—occupies space and thus detracts from the desired end result. A solution is to add a high percentage of powdered, very high density material to the adhesive in the innermost rims and further reduce the adhesive density at the outermost rims, thereby equalizing the stress potential of all rims and increasing the energy storage capacity. Materials having a wide variety of densities may be used for this purpose. Representative materials include aluminum, hafnium, mercury, iridium, lithium, osmium, rhenium, tantalum, tungsten, iron, copper, and lead. Colloidal or amalgam powders of the appropriate materials could be mixed with the epoxy to provide the described benefits.

As will be recognized, fiber-wound composite rims do not transfer their radial stress back to the axis of rotation and so therefore are not subjected to the same extremely rigid fabrication requirements as isotropic disks. Even if a flywheel were made of an isotropic rim like steel—which would be very poor in energy density due to the low maximum tangential stress and high material density—the material would still be subject to crack propagation during radial expansions since an isotropic material relies heavily on consistent strength in both the radial and tangential directions. Anisotropic composite rims, however, rely almost entirely on tangential support from fiber to fiber in order to maintain their configurational consistency. This can be enhanced by a number of radial tension winding techniques. For example, since the radial stress approaches zero at the inner and outer radius of a rim, fiber breaks in these areas are not exceptionally harmful. In the inner rim regions where the radial stress is a maximum, although small compared to the tangential stress values, small-scale crack propagation on fiber wound parts are inhibited by the many surrounding fiber layers. In destructively spin-testing fiber wound rims, the solid fiber matrix rim has become an innocuous, fluffy ball of fiber. This failure mode is infinitely preferable to the ultra-high speed metal projectiles created by failure of many isotropic flywheels.

The innocuous failure mode of the rims of the present invention requires very little additional containment structure than the exceedingly lightweight vacuum enclosure coupled with a heat resistant inner lining like silicon carbide. This characteristic of fiber wound rims is in sharp contrast to isotropic wheels which require containment structures that at least double the weight of the overall system.

In preferred embodiments, flywheels 40 of the present invention have the following approximate dimensions at a total physical weight of less than about 3 pounds.

| Flywheel Diameter | 7" | 8" | 9" |
|---|---|---|---|
| Flywheel thickness ($t_f$) | 2" | 2" | 2" |
| Hub Diameter | 4" | 4" | 4" |
| Rim thickness ($t_r$) | 0.75" | 1.2" | 1.0" |
| Distance from axis to rim ($D_r$) | 2.45" | 2.85" | 3.7" |

Once assembled, flywheels 40 can be slipped over the axial portions of shaft assembly 18. Shaft assembly 18 magnetically supports flywheels 40, which are designed to rotate friction-free within an evacuated protective housing 10. The hub portion of flywheels 40 are supported both axially and radially by magnetic shaft bearings 32, which are designed to support all static loads and re-center small moment loads.

Referring to FIG. 2, end bells 14 and, hence, housing 10 support magnetic rings 22. In preferred embodiments, end bells 14 further support at least one electromagnetic coil 24 and a plurality of adjustable cams 26 enclosed by vacuum caps 20. The end bells 14 are pressed and then bolted onto the shaft assembly. The end bells 14 and shaft assembly, in turn, support lateral wall 12. At this point, with suitable O-rings installed, cams 26 are adjusted and the inner portion of protective housing 10 is evacuated via valve 21.

Housing rings 22 are preferably fabricated from an electromagnetic material. A predetermined distance Dz separates housing rings 22 from second magnetic rings 58. As discussed above, the present energy storage devices are designed such that housing rings 22 and second rings 58 repel one another and, thus, serve to prevent contact between flywheels 40 and housing 10.

As will be appreciated by those skilled in the art, the energy storage devices of the present invention are designed to act reversibly as either a generator or a motor, depending upon whether electric power is transferred into or out of the storage device. Thus, the present devices preferably comprise transfer means for transferring energy into and out of the device, that is, for receiving and releasing energy, especially electrical energy. It will be appreciated that the term "electrical energy" includes any electrical signal which enters or exits the device.

Transfer means according to the present invention comprise a system whereby housing rings 22, coils 24, shaft bearings 32, and shaft sleeves 34 are placed in electrical communication with one another. In certain embodiments, for example, these elements are connected by electrically conductive wire (not shown) or some other suitable means. In preferred embodiments, the transfer means comprises a plug, port or other type of connector (not shown) on the outer portion of housing 10 to permit electrical communication between housing rings 22, coils 24, shaft bearings 32, shaft sleeves 34 and devices such as generators and motors which are external to the energy storage devices of the present invention.

In preferred embodiments, transfer means comprise shaft sleeves 34 or some equivalent device having the properties of an electromagnet, as well as bearing sleeve 52 or some equivalent device having the properties of a permanent magnet. In the input mode, electric energy is provided to shaft sleeve 34 to modulate its magnetic field. As will be recognized, the interaction of this magnetic field with bearing sleeve 52 causes flywheel 40 to rotate. In the output mode, bearing sleeve 52 rotates around shaft 30 and interacts with shaft sleeve 34 to generate an electric- potential which can be drawn away and used by any of the many methods known in the electrical arts.

In other embodiments, transfer means comprise coil 24 or some equivalent device having the properties of an electromagnet, as well as magnet 76 or some equivalent device having the properties of a permanent magnet. In preferred embodiments, coils 24 are constructed in a flat, pancake-like shape in order to conserve axial space and are positioned to be in electromagnetic communication with the permanent magnets 76 housed within the assemblies 70. Coils 24 are separated from the plane defined by the rotation of permanent magnets 76 by a distance $D_3$ which depends upon the relative composition and size of coils 24 and magnets 76. In the input mode, electric energy is provided to coil 24 to modulate its magnetic field. As will be recognized, the interaction of this magnetic field with permanent magnets 76 causes the flywheel 40 to rotate. In the output mode, rotating permanent magnets 76 interact with coils 24 and generate an electric potential therebetween which can be drawn away and used. In preferred embodiments wherein the transfer means comprises shaft sleeves 34 and bearing sleeves 52, coils 24 are employed to sense the rotational passage of magnets 76. Coils 24 then generate a plurality of synchronization pulses and provide a rotational rate reference to a digital control system.

Since the electromagnetic outcoupling torque is designed to be inversely proportional to RPM, the forces between permanent magnets (52 or 76) and electromagnets (34 or 24) are only on the order of gram-inches at the operative rotational speeds of the system. In principle, a large number of electromagnets (34 or 24) can be electronically activated in such a manner that a constant frequency input or output can be produced even with a variable RPM. Using transformers and rectifiers, the electrical input can be transformed into a DC or AC level output. In preferred embodiments, a digital control system monitors the power to be extracted from both flywheels such that their RPM's will be held identical, thereby eliminating unwanted gyroscopic forces.

While the energy storage devices of the present invention have been designed with stabilizing systems which employ magnetic forces, it will be recognized that the devices under certain condition may be exposed to external forces which momentarily exceed these magnetic forces. In such event, magnetic elements such as, for example, bearing sleeve 34 and bearing sleeve 52 would likely contact and damage one another. Accordingly, the energy storage devices have also been designed with optional, secondary bearing systems which correct for sudden radially-directed shock or vibration. The secondary bearing systems are largely based upon the interaction of a plurality of shaped members or cams with a liquid-containing circumferential channel.

As shown in FIGS. 2 and 9, cams 26 can be shaped to conform to at least a portion of channel 62. To the extent that channel 62 is circular, cams 26 or at least some portion 26a thereof can be somewhat rounded or arcuate, as shown in FIG. 9b, to conform to channel 62. More preferably, cam 26 is somewhat narrower to minimize its potential area of contact with surface 67. It is preferred, for example, that cam 26 contact surface 67 at a single point. Thus, cam 26 can be needle-shaped or may comprise a slightly bent piece of flexible wire, which itself will be able to absorb a portion of a radial perturbation. Bent wire cams preferably have spring constants which can increase with deflection. Where cam 26 is a needle, wire, or other pointed element, it preferably is positioned to slant or tilt in the rotational direction of flywheel 40, in much the same manner as a phonographic needle slants or tilts in the rotational direction of a pre-recorded vinyl disc.

Cams 26 preferably are fabricated from a lightweight, high-strength material. Preferably, the energy storage device comprises at least four cams 26 on each end bell; the cams should be evenly and symmetrically spaced such that they extend somewhat into the channel 62. Cams 26 are designed to be separated by a predetermined distance from channel surface 64. Channel surface 64 should face toward the axis of rotation in order to contain a liquid during rotation of flywheel 40.

In preferred embodiments, cams 26 are designed to be separated from the surface 67 of liquid 66 by a distance $D_4$, as shown in FIG. 9a. The distance D should be less than the distances $D_1$ and $D_2$ between flywheels 40 and shaft assembly 18 and housing 10, respectively, preferably about one half those distances. The distance $D_4$ between cam 26 and surface 67 of liquid 66 should be adjustable. Thus, cams 26 are preferably mounted on screws 28 or some alternative means for adjusting the distance $D_4$ between cams 26 and surface 67.

During periods of rapid rotation, the secondary bearing system provides a circumferential, ring-like layer of liquid 66 which is forced against channel surface 64, as shown in FIG. 9a. Channel 62 is partially filled with liquid 66 and is designed such that at high RPM the liquid does not overflow but, rather, remains within channel 62 against surface 64 for any anticipated orientations and rotational levels.

Since channel 62 revolves about the flywheel axis of rotation, liquid surface 67 should be uniform and parallel to the to the axis of rotation. If a sudden perturbation occurs which is greater than can be accommodated by the magnetic centering systems, liquid surface 67 acts as an override bearing. The perturbation will cause the nearest cam(s) 26 to contact the surface 67 of liquid 66 for a fraction of a second, as shown in FIG. 9c. This contact produces a restoring force that is proportional to the pressure depth perturbation between cam 26 and surface 67. Thus, the bearing system will absorb the radial perturbation energy and restore the equilibrium position. Since distance $D_4$ is selected to be less than either distance $D_1$ or $D_2$, the interaction of cam 26 and surface 67 prevents the magnetic surfaces located on flywheel 40 from contacting their opposing magnetic surfaces located on shaft assembly 18 or housing 10.

Upon recovery, rotational "g" forces cause liquid 66 to recede away from cam 26 and back to its position before the perturbation, shown in FIG. 9a. Thus, this "liquid bearing" should repair itself many times without ever wearing out. No other known system has this capability.

It will be recognized that liquid bearing surfaces according to the present invention may be established in a wide variety of systems wherein a body such as a flywheel rotates around an axis. In preferred embodiments, liquid bearing systems comprise a shaft which defines an axis of rotation, a body which is adapted to rotate around the axis and which comprises at least one continuous surface which faces toward the axis, and a liquid proximate the surface and adapted to form a substantially uniform layer in contact with the surface upon rotation of the body.

Any of a wide variety of liquids can be employed in the bearing systems of the present invention. Preferred liquids do not emit gas under the influence of a vacuum. Thus, liquid 66 should have as low a vapor pressure as possible. Also, liquid 66 should be sufficiently stiff and- /or viscous to remain within channel 62 during periods of low rotational "g" forces, such as when flywheels 40 are stationary. Preferred liquids include relatively stiff, non-melting, silicone vacuum greases such as those commercially-available from the Dow-Corning Co. of Midland, Mich. Preferred liquids also include ferromagnetic fluids, which become increasingly solid and viscous upon application of a magnetic field.

The energy storage devices of the present invention can be designed to deliver at least 2500 Watts/lb output with no effect on potential life cycles. Operational life is expected to be greater than 25 years based upon fatigue failure data relating to the fiber. The charge-discharge cycles should be at least 10,000 and the depth of discharge should be completely unaffected by use. Energy density in preferred embodiments is calculated to be greater than about 75 W-Hrs/lb, with considerable future growth potential. The energy storage devices of this invention are free of the many safety and environmental hazards associated with known battery systems.

When designing an "optimum" kinetic energy storage device, several basic factors must be taken into consideration. For example, the total desired energy storage dictates the size, weight, and operational RPM. Once the desired size for the system has been chosen—that is, the maximum allowable outer radius and axial height have been determined—the operational RPM and the rim and hub thickness determine the total energy per unit volume storage. After dynamical balancing, the primary constraints on operational RPM are the tangential and radial stress of the rim and hub. Therefore, the rim and hub thickness can be adjusted to lie within the material stress limits for the chosen operational RPM. However, there must be some criteria for picking the unknown parameters—that is, the rim and hub thickness and operational RPM. One set of criteria could be to maximize the total energy in watt-hours, maximize the energy density in watt-hours per pound, maximize the total energy per unit swept volume in watt-hours per pound per cubic inch, or minimize the total weight in pounds or minimize the total system cost. Of course, all criteria are subject to meeting the maximum allowable tangential and radial stress of the component materials while still meeting the power input and output requirements of the desired application.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A bearing system comprising:
    a shaft which defines an axis of rotation;
    a body adapted to rotate around said axis, wherein:
        said body comprises at least one continuous surface which faces toward the axis; and
        a portion of said body is disposed between said surface and said shaft; and
    a substantially uniform liquid layer in contact with the surface.

2. The bearing system of claim 1 wherein the body is a substantially anisotropic flywheel.

3. The bearing system of claim 1 wherein the liquid comprises a silicone vacuum grease.

4. The bearing system of claim 1 further comprising a nonrotating member disposed opposite said liquid layer between said liquid layer and said shaft.

5. The bearing system of claim 4 wherein said member is arcuate.

6. A bearing system comprising:
    a shaft which defines an axis of rotation;
    a body adapted to rotate around said axis, wherein:
        said body comprises at least one continuous surface which faces toward the axis; and
        a portion of said body is disposed between said surface and said shaft; and
    a liquid proximate the surface, said liquid being adapted to form a substantially uniform load bearing layer in contact with the surface upon rotation of the body.

7. The bearing system of claim 6 wherein the body is a substantially anisoptropic flywheel.

8. The bearing system of claim 6 wherein the liquid comprises a silicone vacuum grease.

9. The bearing system of claim 6 further comprising a nonrotating member disposed opposite said liquid layer between said liquid layer and said shaft.

10. The bearing system of claim 9 wherein said member is arcuate.

* * * * *

UNITED STATES PATENT AND TRADEMARK OFFICE
CERTIFICATE OF CORRECTION

PATENT NO. : 5,268,608
DATED : December 7, 1993
INVENTOR(S) : Bitterly et al.

It is certified that error appears in the above-indentified patent and that said Letters Patent is hereby corrected as shown below:

Column 5, line 65, remove hyphen between the words "first face"

Column 6, line 10, insert a hyphen between the words "Flywheel based".

Column 8, line 19, remove "D" and insert --$D_1$--

Column 8, line 19, remove "D" and insert --$D_1$--

Column 12, line 8, after "10" and insert ---$^5$--

Column 14, line 24, remove "$D_2$"-- and insert --$D_2$--

Column 16, line 14, remove "D" and insert --$D_4$--

Signed and Sealed this

Twenty-fourth Day of December, 1996

Attest:

BRUCE LEHMAN

*Attesting Officer*     *Commissioner of Patents and Trademarks*